United States Patent [19]
Itoh et al.

[11] Patent Number: 5,594,646
[45] Date of Patent: Jan. 14, 1997

[54] METHOD AND APPARATUS FOR SELF-DIAGNOSIS FOR AN ELECTRONIC CONTROL SYSTEM FOR VEHICLES

[75] Inventors: Yasunobu Itoh, Okazaki; Kiyohide Katoh, Chiryu, both of Japan

[73] Assignee: Aisin AW Co., Ltd., Japan

[21] Appl. No.: 358,458

[22] Filed: Dec. 19, 1994

[30] Foreign Application Priority Data

Dec. 21, 1993 [JP] Japan ..................... 5-345173

[51] Int. Cl.$^6$ .............. G06F 11/00; G06F 11/32
[52] U.S. Cl. ...................... 364/424.04; 73/117.3
[58] Field of Search ............ 364/424.03, 424.04; 73/117.2, 117.3, 118.1

[56] References Cited

U.S. PATENT DOCUMENTS

| | | | |
|---|---|---|---|
| 4,497,057 | 1/1985 | Kato et al. | 371/29 |
| 4,817,418 | 4/1989 | Asami et al. | 73/118.1 |
| 4,825,362 | 4/1989 | Minami et al. | 364/200 |
| 4,843,557 | 6/1989 | Ina et al. | 364/431.07 |
| 5,005,129 | 4/1991 | Abe et al. | 364/424.03 |

FOREIGN PATENT DOCUMENTS

| | | |
|---|---|---|
| 443137 | 2/1992 | Japan . |
| 4198733 | 7/1992 | Japan . |

OTHER PUBLICATIONS

*Dictionary of Computers, Information Processing & Telecommunications*; 2nd Ed.; Rosenberg; 1984; p. 419.

Primary Examiner—Michael Zanelli
Attorney, Agent, or Firm—Lorusso & Loud

[57] ABSTRACT

In a vehicle control system having a main electronic control unit governing a plurality of subsidiary electronic control units, each of the subsidiary units includes an automatic continuous subsidiary unit self-diagnosis procedure which generates an interrupt signal causing the main electronic control unit to retrieve date and time data from the main unit clock. This subsidiary malfunction date and time data along with details of the subsidiary unit malfunction can be stored in either the main unit memory or the respective subsidiary unit memory for subsequent retrieval and display by an operator via the main control unit. Any malfunction of the main electronic control unit is similarly detected, stored and output by the main control unit for display.

9 Claims, 6 Drawing Sheets

METHOD AND APPARATUS FOR SELF-DIAGNOSIS FOR AN ELECTRONIC CONTROL SYSTEM FOR VEHICLES

BACKGROUND OF THE INVENTION

1. Field of the Invention

This invention relates to method and apparatus for self-diagnosis, suitable for improving the quality of service when a malfunction occurs in a vehicle electronic control system or unit (ECU) in which a main electronic control unit (main ECU) is connected via a communication line to plural subsidiary electronic control units (sub-ECUs).

2. Related Art

As electronic control systems for vehicles have developed, the ECU used in the vehicle has become a more complicated system and now typically includes plural sub-ECUs and a main ECU governing the sub-ECUs. A conventional diagnosis system executes a diagnosis procedure (diagnosis) to detect a malfunction of an ECU under the sole control of the main ECU, so that a malfunction of any of the sub-ECUs is detected only when the malfunctioning state occurs during the time that the main ECU calls for the ECUs to diagnose malfunctions (Self-Diagnosis).

A system for conventional self-diagnosis of sub-ECUs is shown in FIG. 4. A main ECU 1 comprises a CPU 2 having a system check function and a diagnosis memory function, a memory 3 for storing diagnosis information, a clock IC 4 for generating date and time information on demand, to provide the date and time of the system check for recording in the memory, a battery 5 for back-up of the memory and the clock IC, and a communication interface 6 for data communication with sub-ECUs 10.

Each Sub-ECU 10 (10A, 10B, ...) comprises a CPU 11 having a self-diagnosis function, a memory 12 for storing diagnosis results obtained by the sub-ECU, and a communication interface 13 for data communication with the main ECU 1.

Referring to FIG. 5, when the system diagnoses itself, the main ECU starts a system check under direction of a service person or the like and then commands the respective sub-ECUs to start the self-diagnosis. After checking conditions of the communications with the respective sub-ECUs, the main ECU diagnoses itself. Meanwhile, each sub-ECU diagnoses itself and outputs the result of the self-diagnosis. The main ECU then sequentially receives the results of the self-diagnoses executed at the respective sub-ECUs. The main ECU displays the results of the system check done by the main ECU itself and by the respective sub-ECUs. These displayed results include those for self-diagnosis by the respective sub-ECUs and that of the main ECU and the results of the checks of the communications with the respective sub-ECUs.

FIG. 6 shows processing steps of an automatic diagnosis procedure of the main ECU. During operation of this procedure, the main ECU checks the conditions of communications with the respective sub-ECUs and executes the self-diagnosis of the main ECU itself to monitor any malfunctions in the main ECU. When no current malfunction is detected, this process is repeated in a predetermined cycle. When malfunction is detected, the malfunction details and the date and time are written in the memory with a battery for each time the malfunction occurs. The main ECU then determines whether the display of the diagnosis memory has started. If it has not started, the process returns to the beginning, and the main ECU checks the conditions of the communications linking the respective sub-ECUs. If the display has started, the main ECU calls up the diagnosis information and the date and time of occurrence of the malfunction out of the memory and displays the diagnosis memory contents. The respective sub-ECUs do nothing during this diagnosis memory function. Such a diagnosis system for an ECU is disclosed in, for example, Japanese Patent Laid-Open No. 198733/1992.

Although conventional systems can detect malfunction through the diagnoses of the respective ECUs while a current malfunction is occurring, the system cannot detect a malfunction when the malfunctioning is discontinuous, or when the malfunctioning occurs randomly. Thus, the conventional system does not have the capability of giving information of past (through the present) conditions of the respective sub-ECUs and the date and time at which a past malfunction occurred in the sub-ECUs. Because the conventional system does not provide the histories of transient malfunctions of respective sub-ECUs, it takes time to find malfunction causation and solution and the quality of servicing may suffer. Moreover, although simply applying a self-diagnosis function, such as executed by the main ECU, to the sub-ECUs will enable the sub-ECUs to achieve such a function, this expansion may create problems in that the apparatus will become bulky and costly.

SUMMARY OF THE INVENTION

It is an object of the present invention to provide a method and apparatus for self-diagnosis for an electronic control system for vehicles, without cost increase, with minimal requirement for additional parts, and with the capability of diagnosing events of a discontinuing nature, which occur at the respective ECUs.

To accomplish the above object, according to a first aspect of the invention, there is provided a self-diagnosis method for a vehicle electronic control system in which a plurality of subsidiary electronic control units are connected by a communication line to a main electronic control unit for governing the respective subsidiary electronic control units, the method comprising the steps of: continuous self-diagnosing by each subsidiary electronic control unit to diagnose itself, signaling each malfunction, when detected, from the respective subsidiaries electronic control unit to the main electronic control unit; interrupting the main electronic control unit for retrieving the date and time of occurrence of the malfunction; and storing the date and time of occurrence of the malfunction, as well as malfunction details, in a memory means either in the main electronic control unit or in the said subsidiary electronic control unit.

According to a second aspect of the invention, there is provided a self-diagnosis apparatus for a vehicle electronic control system that includes a main electronic control unit and a plurality of subsidiary electronic control units governed by the main electronic control unit, which apparatus performs a system check for diagnosing the main electronic control unit and has a diagnosis memory function for storing the results of the execution of the system check function and the results of individual self-diagnosis executed by each of the subsidiary electronic control units, as well as the corresponding date and time at which the malfunction occurred. The apparatus includes communicating means for, when any of said subsidiary electronic control units detects a malfunction by self-diagnosis, reporting the malfunction to the main electronic control unit; clock processing means provided in the main electronic control unit for, when receiving report of a malfunction from a subsidiary electronic unit, processing the date and time of occurrence of the malfunction; and memory control means for storing in the memory means details of a malfunction of any of the subsidiary electronic control units and the date and time of occurrence of the malfunction as the result of the self-diagnosis of the respective subsidiary electronic control units and for, retrieving and outputting diagnosis information out of said memory means, responsive to execution of the diagnosis memory function by the main electronic control unit.

According to other aspects of the invention, there are also provided self-diagnosis systems further comprising one of the following features:

(1) The memory means is within the main electronic control unit.

(2) The memory means is within each subsidiary electronic control unit.

(3) The memory means includes a non-volatile memory.

(4) The non-volatile memory is a memory capable of electrically writing and electrically erasing information.

According to the invention, each subsidiary electronic control unit continuously diagnoses itself and, when detecting a malfunction, requests interruption by means of communication to the main electronic control unit. If equipped with diagnosis information memory means, the subsidiary electronic control unit interrupts the main electronic control unit to request the present date and time based on the malfunction detection. As processed clock information is transmitted to the subsidiary electronic control unit, the subsidiary electronic control unit stores the date and time of occurrence of the malfunction and the malfunction details together as diagnosis information. In contrast, if not equipped with diagnosis information memorizing means, the subsidiary electronic control unit interrupts the main electronic control unit and transmits the malfunction details, upon detection, to the main electronic control unit. The main electronic control unit, when interrupted, executes an interrupt procedure for receiving the malfunction details from the subsidiary electronic control unit, receives the current date and time, and stores the malfunction details along with the date and time in the memory means of the main electronic control unit.

According to the above-described self-diagnosis method of the invention, each time a malfunction is detected through the self-diagnosis executed at the respective subsidiary electronic control units, the date and time of occurrence and details of the malfunction are stored in the memory means by use of the clock function of the main electronic control unit. Therefore, the electronic control system can be diagnosed without any new additional clock function. The histories of diagnosis results of the respective subsidiary electronic control units can be displayed on user's demand, thereby facilitating finding malfunction causation and solution, and thereby improving the quality of service.

According to the second aspect of the invention, the communicating means reports to the main electronic control unit when the automatic self-diagnosis of the respective subsidiary electronic control unit detects a malfunction. The main electronic control unit operates the clock processing means so as to output the date and time of the occurrence of the malfunction. The control means stores the date and time of the occurrence of the malfunction and malfunction details in the memory means in either the main electronic control unit or in the respective subsidiary electronic control units. Upon user's demand, the control means retrieves and displays the stored diagnosis information. According to the self-diagnosis apparatus of the invention, the respective subsidiary electronic control units constantly execute the self-diagnosis, and the detected details and date and time of occurrence of any malfunction are stored, so that the respective subsidiary electronic control units do not need to have a clock function, thereby simplifying the construction of the apparatus and achieving the same advantages as achieved by the above-described method.

BRIEF DESCRIPTION OF THE DRAWINGS

In the drawings, like numerals denote like parts or portions.

DESCRIPTION OF THE PREFERRED EMBODIMENTS

Figure 4:
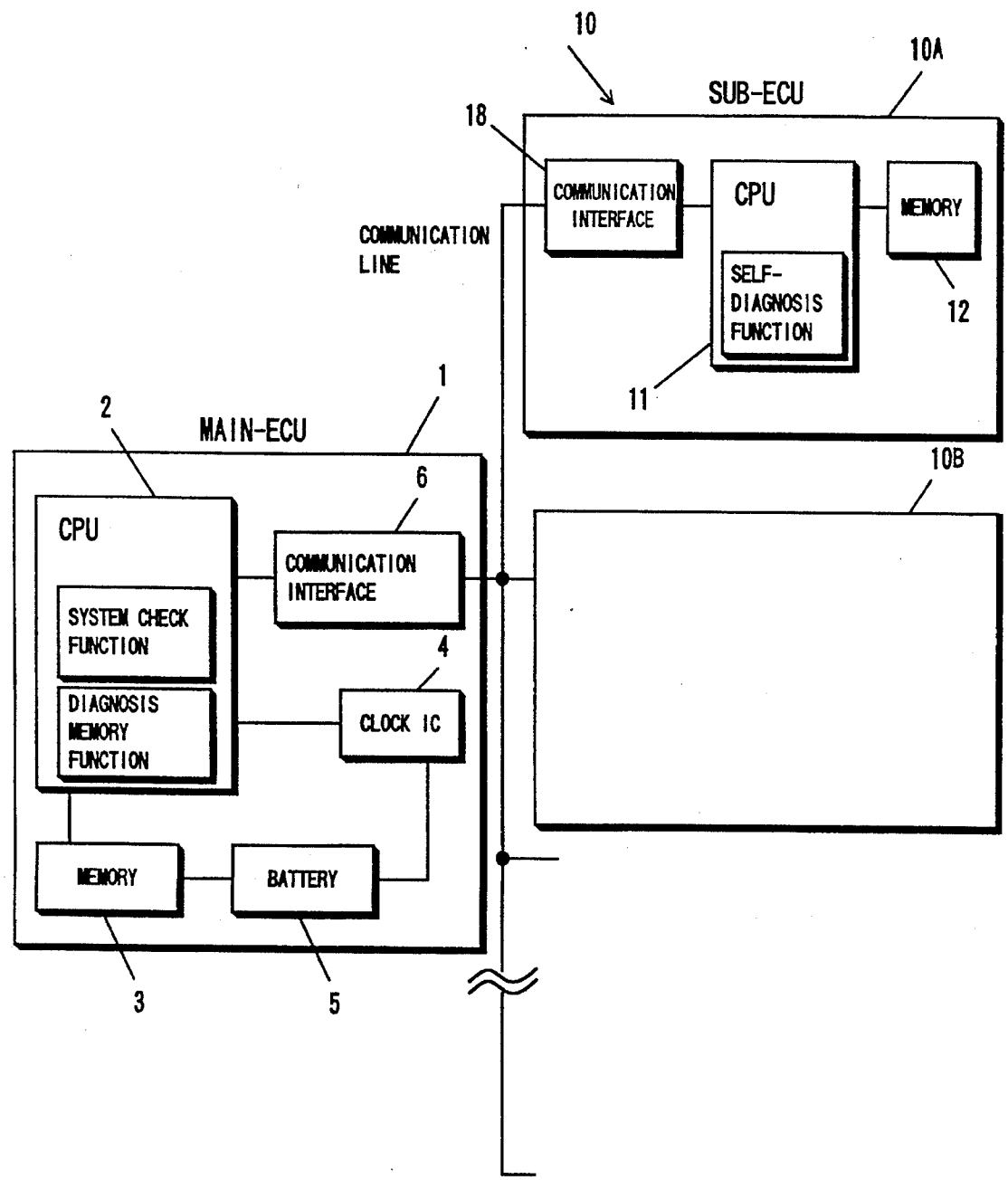
FIG. 4 is a block diagram of a conventional self-diagnosis apparatus for a vehicle electronic control system.
Figure 5:
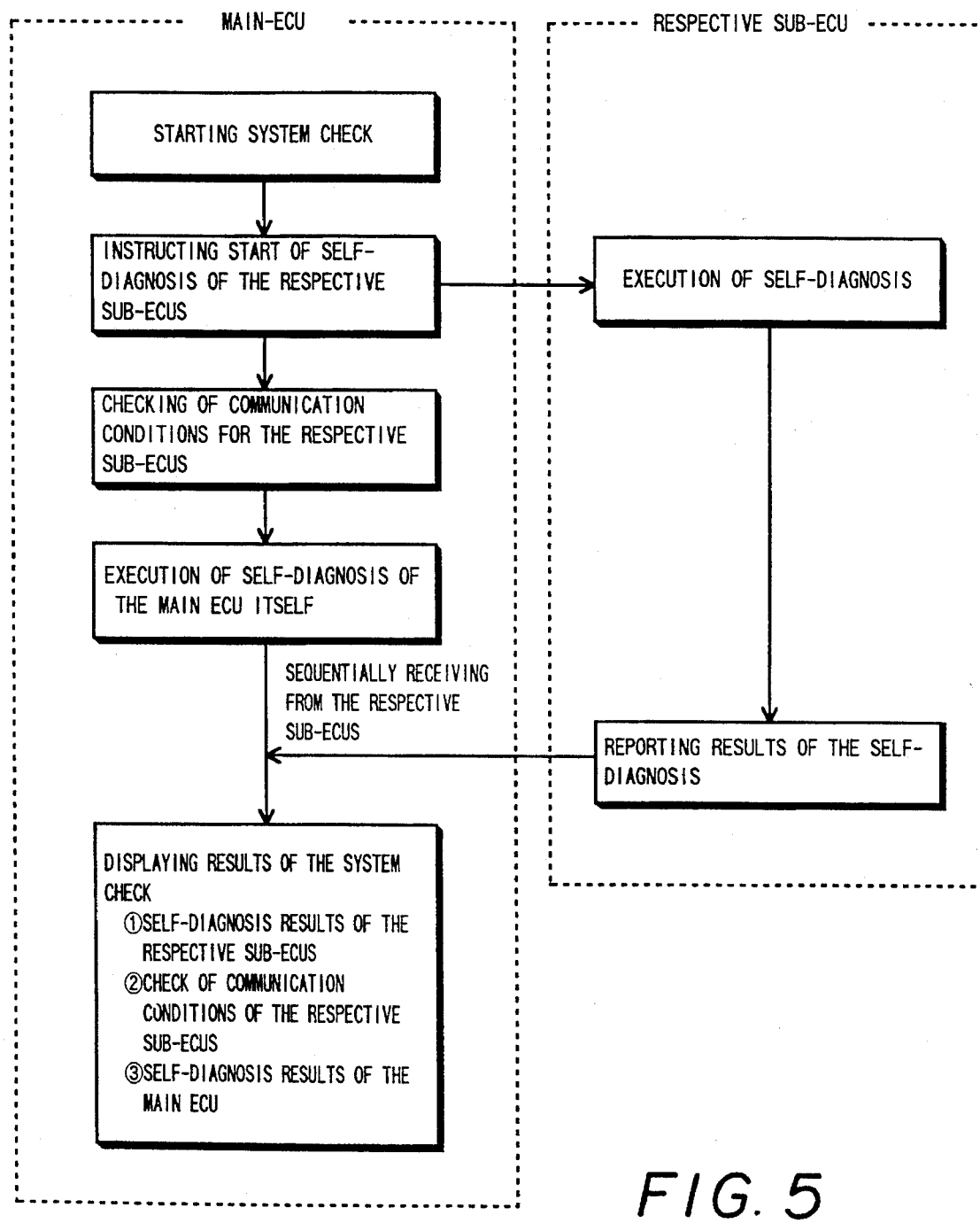
FIG. 5 is a flowchart of the processing steps of system diagnosis by a conventional system.
Figure 6:
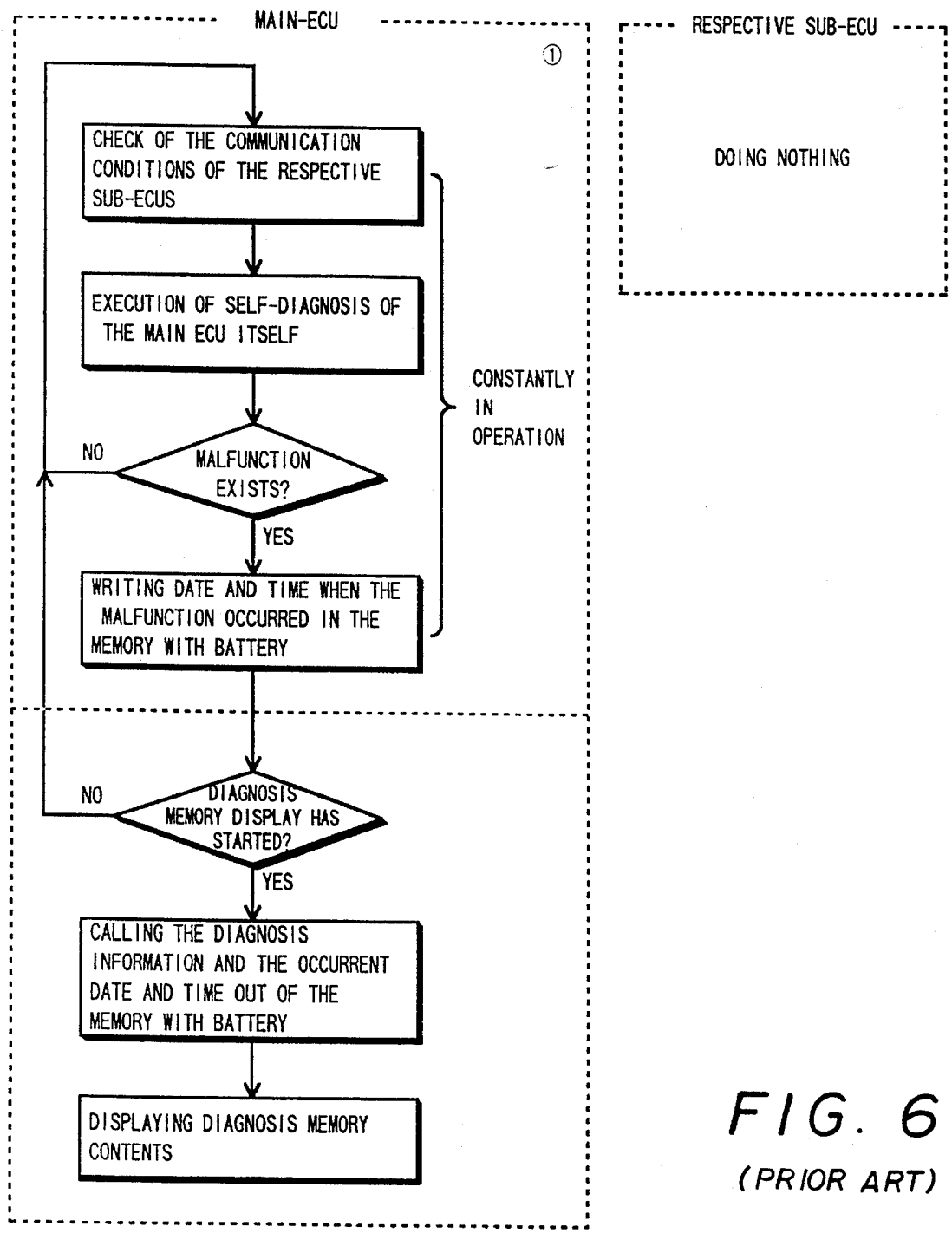
FIG. 6 is a flowchart of the processing steps for diagnosis memorization in a conventional main ECU.

The preferred embodiments of the invention will be described with reference to the attached drawings. To the extent the system shares in common details of construction as described with reference to FIG. 4, the description thereof will be omitted.

Embodiments of a diagnosis memory function, a feature of the invention, will first be described.

Figure 1:
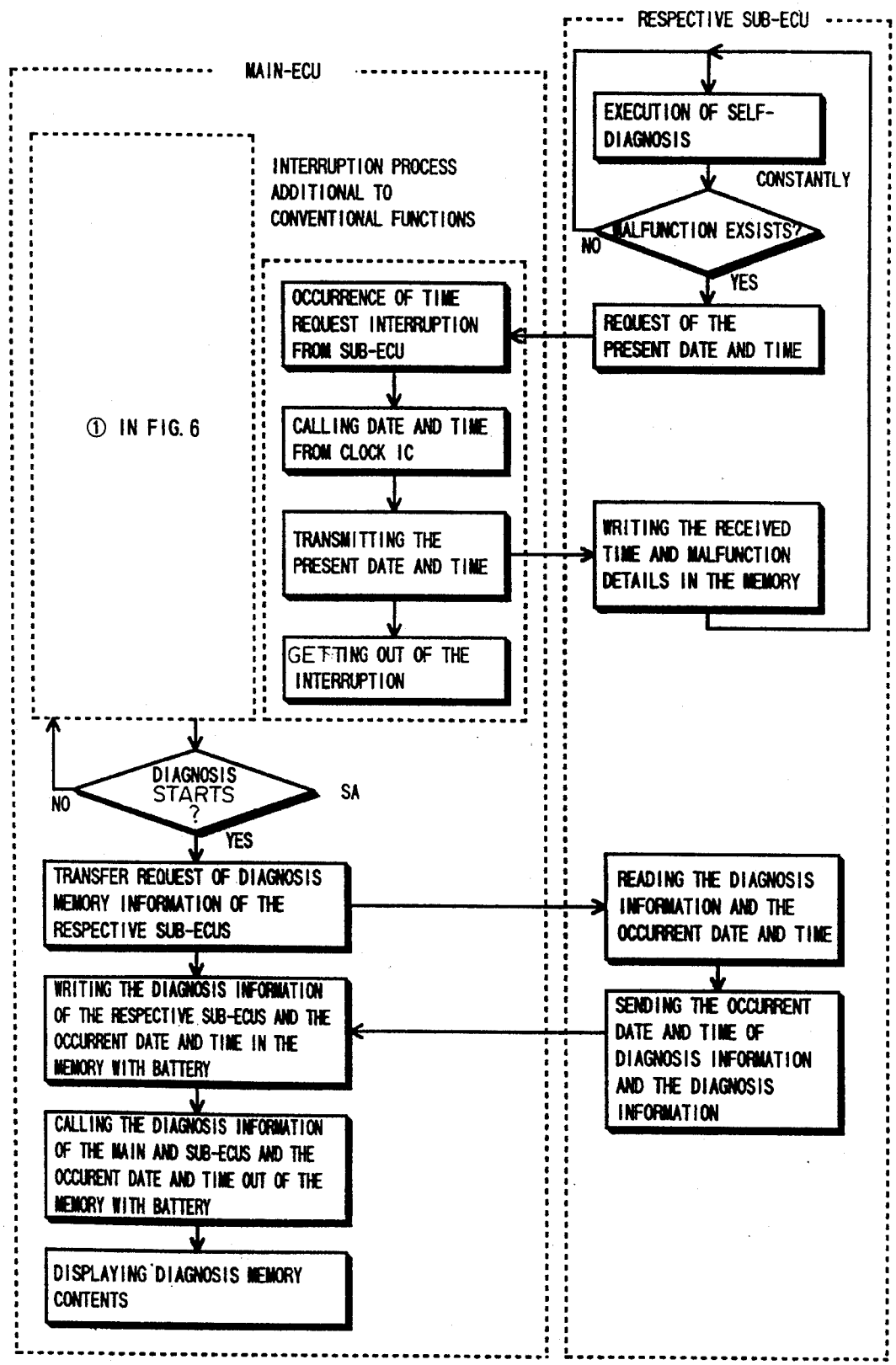
FIG. 1 is a flowchart of processing steps for effecting a diagnosis memory function, as used by the method and apparatus for self-diagnosis of an electronic control system for vehicles according to a first embodiment of the invention.

FIG. 1 shows a first embodiment of processing steps for effecting the diagnosis memory function. In this embodiment, details of the malfunction detected by self-diagnosis executed in the respective sub-ECUs 10 and the present date and time given by a main ECU 1 are written in the memory 12 of the sub-ECU 10.

The main ECU 1 has a procedure to fetch (retrieve) the respective sub-ECUs' diagnosis information from the sub-ECU and to display the system diagnosis information that the main ECU 1 obtains and stores by itself along with the diagnosis information that the respective sub-ECUs 10 obtain and store. The main ECU 1 constantly executes a system check of itself in the same manner as a conventional system and stores, when detecting a malfunction, malfunction details (diagnosis information) at the time that the malfunction occurs and the date and time of occurrence of the malfunction in the memory 3 with battery 5. The main ECU 1 fetches the diagnosis information obtained through the self-diagnosis function executed at the respective sub-ECUs. The main ECU 1 includes an interrupt routine initiated by a date-and-time request or signal from one of the respective sub-ECUs 10, either by a hardware interrupt of the CPU 2 or by monitoring a communication input from the sub-ECUs.

When a sub-ECU 10A makes a time request, the interrupt routine in the CPU 2 of the main ECU 1 calls the date and time out of a clock IC 4, transmits this date and time to the requesting sub-ECU 10A, and then terminates the interrupt routine. The corresponding sub-ECU 10A writes the received date and time into its memory 12 along with the malfunction details.

When the main ECU 1 executes the diagnosis memory function and when the start of diagnosis memory is confirmed in step A, the main ECU 1 requests the sub-ECU 10A to transfer diagnosis information stored therein. The sub-ECU 10A reads the diagnosis information and the date and time of occurrence information out of the memory 12 in response to the transfer request and supplies the information to the main ECU 1. The information sent from the sub-ECU 10A is written in the memory 3 with battery 5. When the user requests a display of the contents of the diagnosis memory, the main ECU 1 calls up the diagnosis information of the main ECU 1 and the respective sub-ECUs 10 and the date and time of occurrences and displays them at a display unit.

Figure 2:
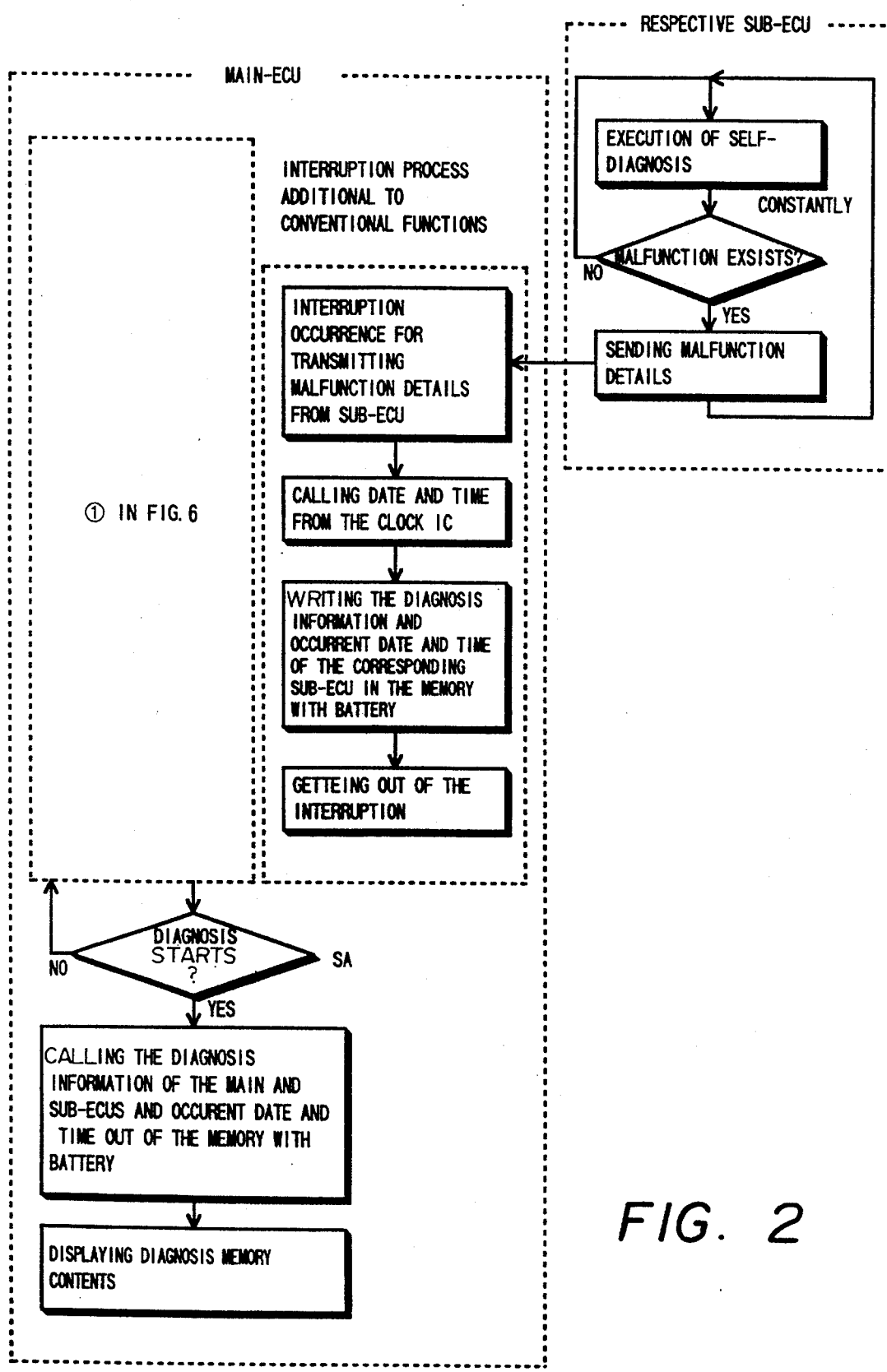
FIG. 2 is a flowchart of processing steps according to a second embodiment of the invention.

FIG. 2 shows a second embodiment of processing steps for effectuating a diagnosis memory function. In this embodiment, when any of the sub-ECUs 10 detects a malfunction by the self-diagnosis executed therein, the sub-ECU 10A sends the details of the malfunction to the main ECU 1, and the main ECU 1 writes the diagnosis information in the memory 3 with battery 5 and manages it. The main ECU 1 calls the date and time from the clock IC 4 when the sub-ECU 10A generates a signal to interrupt the ECU 1 to call an interrupt procedure for receiving malfunction details. The main ECU 1 writes the diagnosis information from the sub-ECU 10 and the date and time of occurrence of the malfunction in the memory 3 with battery 5. When the main ECU 1 executes the diagnosis memory function upon an instruction from a user, the diagnosis information of the main ECU 1 and the respective ECUs 10 and the date and time of occurrence data are called out of the memory 3 and displayed.

Figure 3:
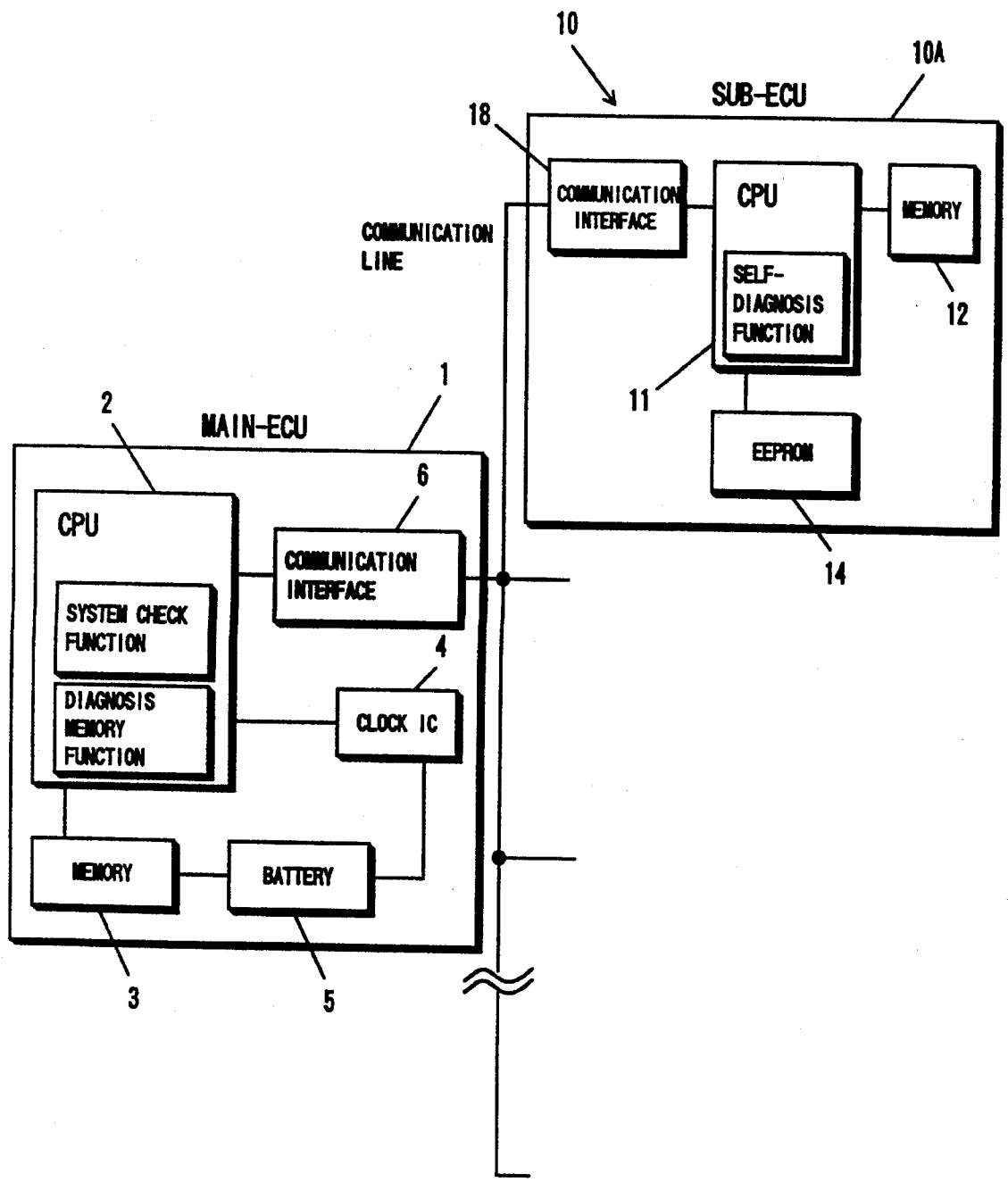
FIG. 3 is a block diagram of an embodiment of the apparatus of the invention.

FIG. 3 shows yet another embodiment of a system for effectuating the diagnosis memory function. In this system, each sub-ECU 10A is capable of researching malfunction history if the power is turned off. Each sub-ECU 10A has a ROM (EEPROM) 14 capable of electrically writing and electrically erasing information, as a memory to store diagnosis information obtained through execution of the self-diagnosis function. The EEPROM 14 stores self-diagnosis results of the sub-ECU 10A, as well as the date and time of occurrence of the malfunction. The diagnosis memory function of the main ECU 1 is the same as described with reference to FIG. 1. Upon time request of the present date and time from a sub-ECU 10A, the present date and time sent from the main ECU 1 and the malfunction details are written in the EEPROM 14. This diagnosis information is fetched by the execution of the diagnosis function of the main ECU 1 and is stored in the memory 3 with battery 5 in the main ECU 1. The diagnosis information is displayed upon an instruction from a user.

Although in the above-described embodiment each sub-ECU has an EEPROM, the EEPROM may be replaced with a memory with battery.

What is claimed is:

1. A self-diagnosis method for a vehicle electronic control system in which a plurality of subsidiary electronic control units are connected by a communication line to a main electronic control unit for governing the respective subsidiary electronic control units, the method comprising the steps of:

each subsidiary electronic control unit continuously diagnosing itself and signaling any detected malfunction to the main electronic control unit;

interrupting normal processing of said main electronic control unit in response to said signaling of a detected malfunction to retrieve the date and time of occurrence of the malfunction from a date and time clock; and storing the date and time of occurrence of the detected malfunction, as well as details of the detected malfunction, in memory means of one of said main electronic control unit and the subsidiary electronic control unit detecting the malfunction.

2. A self-diagnosis apparatus for a vehicle electronic control system that includes a main electronic control unit and a plurality of subsidiary electronic control units governed by the main electronic control unit, which performs a system check function for diagnosing said main electronic control unit and a diagnosis memory function for storing the results of the execution of the system check function and results of individual self-diagnosis executed by said subsidiary electronic control units, as well as the corresponding date and time at which the malfunction occurs, said apparatus comprising:

communicating means for, when any of said subsidiary electronic control units detects a malfunction by the self-diagnosis, signaling the malfunction to said main electronic control unit;

a date and time clock;

clock processing means provided in said main electronic control unit and responsive to the malfunction signal from any of said subsidiaries electronic control units for retrieving the date and time of occurrence of the malfunction from the date and time clock; and memory means for storing details of the malfunction of any of said subsidiary electronic control units and the date and time of occurrence of the malfunction as the result of the self-diagnosis of the respective subsidiary electronic control units, and means for, when said main electronic control unit executes the diagnosis memory function, calling and outputting the details and the date and time of a malfunction out of said memory means.

3. A self-diagnosis apparatus as set forth in claim 2, wherein said memory means is memory means of said main electronic control unit.

4. A self-diagnosis apparatus as set forth in claim 2, wherein said memory means is memory means of each of said subsidiary electronic control units.

5. A self-diagnosis apparatus as set forth in claim 2, wherein said memory means is a non-volatile memory means.

6. A self-diagnosis apparatus as set forth in claim 5, wherein said non-volatile memory is a memory device capable of electrically writing and electrically erasing information.

7. A self-diagnosis apparatus for a vehicle electronic control system comprising:

a main electronic control unit including date and time clock means, a main unit memory, and an automatic continuous main unit self-diagnosis procedure to detect a malfunction of the main electronic control unit to retrieve main unit malfunction clock data from said clock means and to store in said main unit memory the malfunction clock data along with details of the main unit malfunction;

a plurality of subsidiary electronic control units connected to and governed by said main electronic control unit;

each of said subsidiary electronic control units including a subsidiary memory and an automatic continuous subsidiary unit self-diagnosis procedure to detect a malfunction of the respective subsidiary electronic control unit to transmit a subsidiary malfunction signal to the main electronic control unit;

said main electronic control unit including an interrupt procedure responsive to the subsidiary malfunction signal for retrieving subsidiary malfunction clock data including a date and time from said clock means;

means for storing said subsidiary malfunction clock data along with details of the corresponding subsidiary malfunction in one of said main unit memory and said respective subsidiary memory; and said main electronic control unit further including a diagnosis display procedure for retrieving and outputting the stored main unit malfunction clock data, the stored details of the main unit malfunction, the stored subsidiary malfunction clock data and the stored details of the subsidiary malfunction.

8. A self-diagnosis apparatus for a vehicle electronic control system as claimed in claim 7 wherein said storing means stores the subsidiary malfunction clock data and the details of the subsidiary malfunction in said respective subsidiary memory; said interrupt procedure includes a function for transmitting the subsidiary malfunction clock data to the corresponding subsidiary electronic control unit; and each of the subsidiary electronic control units include a procedure for receiving and storing the subsidiary malfunction clock data in the corresponding subsidiary memory.

9. A self-diagnosis apparatus for a vehicle electronic control system as claimed in claim 7 wherein said storing means stores the subsidiary malfunction clock data and the details of the subsidiary malfunction in said main unit memory; each of the subsidiary electronic control units includes a procedure for transmitting the details of the subsidiary malfunction to the main electronic control unit; and the interrupt procedure includes a function for receiving the transmitted details of the subsidiary malfunction and storing the received details of the subsidiary malfunction along with the subsidiary malfunction clock data in the main unit memory.

* * * * *